May 30, 1933.  J. J. MINTZ  1,912,295
MIXING VALVE
Filed May 24, 1932  2 Sheets-Sheet 1
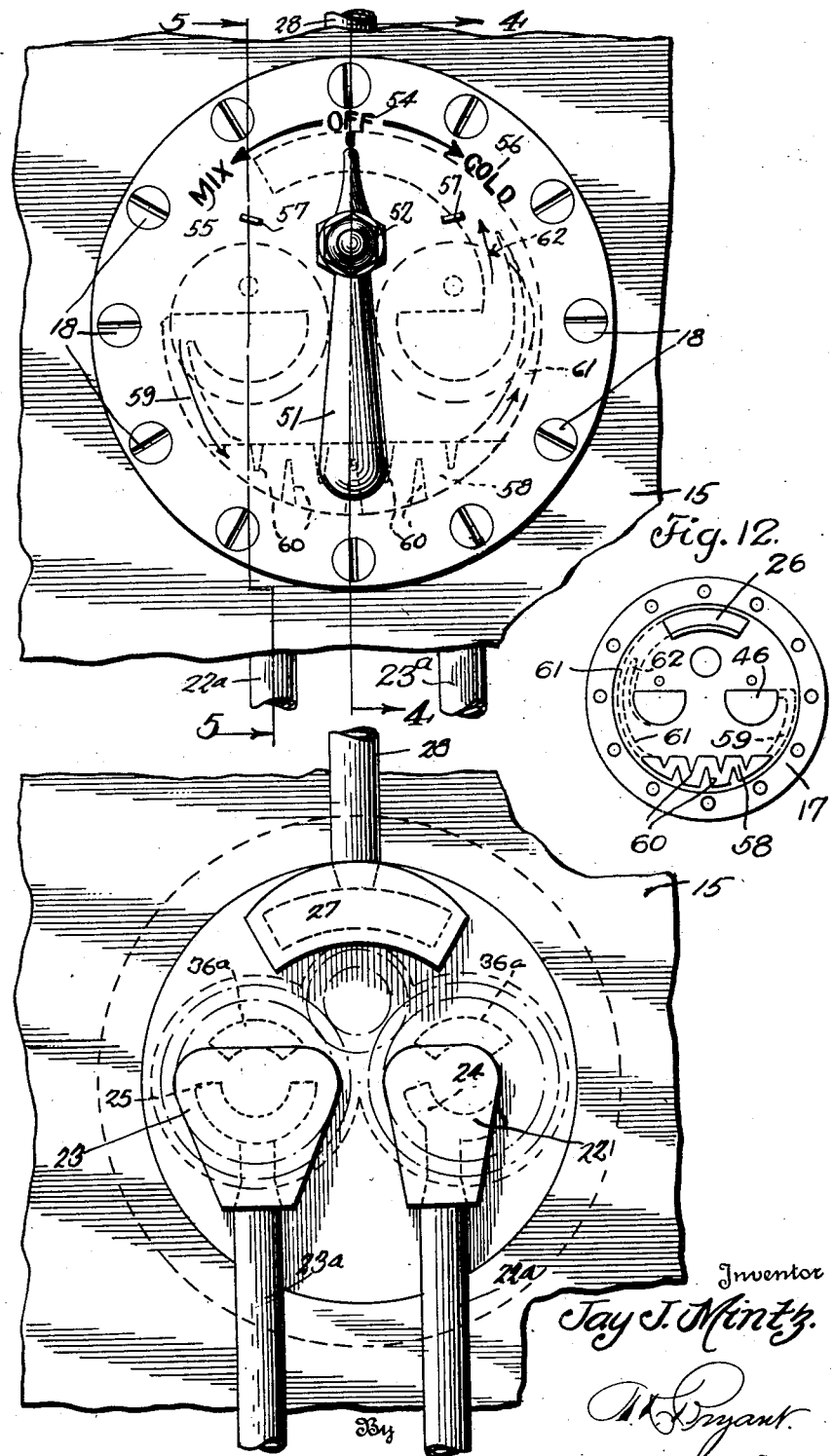

May 30, 1933. J. J. MINTZ 1,912,295
MIXING VALVE
Filed May 24, 1932 2 Sheets-Sheet 2
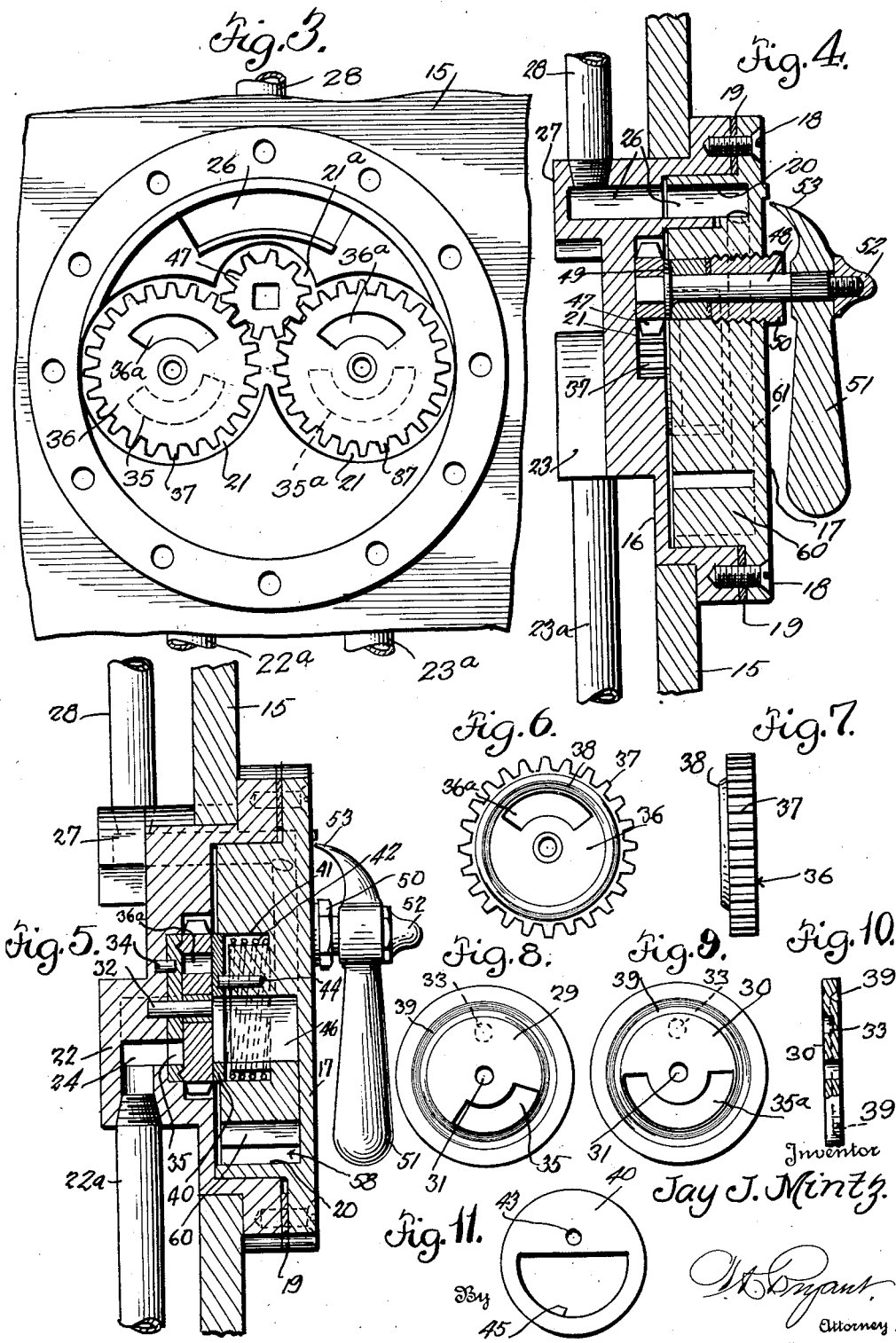

Patented May 30, 1933

1,912,295

UNITED STATES PATENT OFFICE

JAY J. MINTZ, OF NEW YORK, N. Y.

MIXING VALVE

Application filed May 24, 1932. Serial No. 613,278.

This invention relates to certain new and useful improvements in mixing valves.

The primary object of the invention is to provide a mixing valve constructed in a manner for the instant supply to a shower head or other discharge element, a mixture of hot and cold water without first passing through a cold zone or to supply cold water only, the mixing valve operating to assure and maintain a uniform mixture of hot and cold water and to control and regulate the volume and temperature of the water.

A further object of the invention is to provide a mixing valve of the foregoing character wherein the valve mechanism is designed to prevent the feeding of hot water alone so that the danger of scalding the user of the apparatus is eliminated by means of condensing boiler steam flowing through the valve structure and for reducing the temperature of the hot water.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a front elevational view of a mixing valve constructed in accordance with the present invention, a part of the interior mechanism being illustrated by dotted lines with the assembled valve structure illustrated as supported on a partition, wall or the like;

Figure 2 is a rear elevational view of the mixing valve showing the hot and cold water inlet, the mixing chamber and the single outlet;

Figure 3 is a front elevational view of the valve casing with the cover wall removed to illustrate the valve gears and the operating pinion therefor;

Figure 4 is a vertical cross-sectional view taken on line 4—4 of Figure 1, showing the operating handle engaged with the valve gear operating pinion;

Figure 5 is a vertical cross-sectional view taken on line 5—5 of Figure 1, showing the hot water valve gear and means for holding the same seated together with the condensation chamber in the lower end of the valve casing;

Figure 6 is a face view of one of the valve gears;

Figure 7 is an edge elevational view of a valve gear;

Figure 8 is a face view of the hot water valve seat with the arcuate valve opening therein;

Figure 9 is a face view of the cold water valve seat with the arcuate valve opening therein being of greater length than the hot water valve opening;

Figure 10 is an edge elevational view of one of the valve seats, partly in section;

Figure 11 is a face view of one of the valve pressure plates, and

Figure 12 is an inner face view of the cover for the casing.

While the invention will be hereinafter referred to and specifically described as a mixing valve for hot and cold water for regulating the flow and temperature of water delivered to a shower head or the like, it is to be understood that this mixing valve may be employed in any art where it is desired to mix and control the flow and mixture of other fluid. The mixing valve is illustrated as mounted upon a partition or wall 15 by being set into an opening therein, the forward side of the mixing valve being provided with the usual control handle while the rear side of the mixing valve in back of the wall 15 has the hot and cold water supply pipes connected thereto as well as the single outlet pipe for the mixed water. The mixing valve comprises a casing 16 set into an opening in the wall 15, the casing containing the valve mechanism that is confined therein by the casing cover 17 secured to the casing as at 18 and made water-tight by packing or gaskets 19. The inner face of the cover 17 carries an annular flange 20 engaged with the side wall of the valve casing 16 to aid in positioning the cover on the casing.

The bottom wall of the valve casing 16 is provided with a pair of substantially circular depressed portions forming sockets 21 for the reception of valve mechanism to control the flow of hot and cold water, and an intermediate depressed socket 21a of arcuate formation for the reception of valve operating means.

As shown in Figures 2 and 5, the bottom wall 16 of the valve casing carries offset housings 22 and 23 respectively having ports 24 and 25 therein communicating with the hot and cold water valve, the housings 22 and 23 being in communication with hot and cold water supply pipes 22a and 23a respectively. The mixing chamber 26 for hot and cold water is arranged at the upper end of the valve casing and the latter has an offset housing 27 into which the mixing chamber extends while the single outlet pipe 28 leads to a shower head or other discharge element.

The mechanism for controlling the flow of hot and cold water from the supply housings 22 and 23 to the outlet pipe 28 include a pair of valve seats 29 and 30 for the hot and cold water valves respectively, the valve seats being of disk form and seated in the bases of the sockets 21 as shown in Figure 5, each valve seat 29 and 30 having an axial opening 31 to be received on pins 32 anchored in the bottom wall of the valve casing 16 with the pins 32 projecting forwardly of the valve seat for purposes presently to appear. Each valve seat has an eccentrically positioned socket 33 in its bottom face to receive a stud pin 34 anchored in the bottom wall of the casing to hold the valve seat against rotative movement. An arcuate opening 35 is provided in the valve seat 29 to register with the port 24 in the hot water supply housing 22 while the valve seat 30 has a relatively longer arcuate opening 35a therein that registers with the port 25 in the cold water supply housing 23.

A gear wheel valve 36 having peripheral gear teeth 37 is rotatably mounted upon the projecting end of each pin 32 in its respective socket 21 and carries a facial annular V-shaped rib 38 adjacent its peripheral edge to be received in an annular V-shaped groove 39 provided in the adjacent face of its associated valve seat and each gear wheel valve is maintained in operative relation to its seat by a pressure plate 40. As shown in Figures 3, 5 and 6, each gear wheel valve 36 has an arcuate valve opening 36a therein normally out of registry with the opening in the valve seat as shown in Figure 5.

An annular pocket 41 is provided in the inner face of the casing cover 17 in line with each valve pressure plate 40 and houses a coil spring 42 that is engaged with the pressure plate 40 for maintaining the latter engaged with the gear wheel valve associated therewith, the pressure plate 40 being provided with a socket 43 to receive one end of a pin 44 set into the inner face of the cover 17 for holding the pressure plate against rotation. The lower side of the pressure plate is provided with a relatively large segmental opening 45 through which hot or cold water under control of the gear wheel valve flows into the chamber 46.

The operating means for the gear wheel valves 36 includes a pinion 47 disposed in socket 21a and keyed upon the end of the spindle 48 journalled through the casing covering 17 as shown in Figure 4 and with which spindle a packing 49 and bearing gland 50 are associated, the outer end of the spindle 48 having an operating handle 51 adjustably mounted thereon and retained by a cap nut 52 with an indicator finger 53 carried by the handle 51 movable over the cover wall 17 as shown in Figure 1 and associated with informative indicia upon the face of the cover such as an "Off" sign 54, a "Mix" sign 55 and a "Cold" sign 56, stop lugs 57 limiting swinging movements of the handle 51 in opposite directions as will be obvious from an inspection of Figure 1.

A steam condensation and water temperature reducing chamber 58 is disposed adjacent the lower end of the valve casing, the hot water chamber 46 receiving water through the control valve associated therewith being in communication with the chamber 58 by an arcuate passage 59 illustrated by dotted lines in Figures 1 and 12. The upper and lower walls of the chamber 58 carry staggered baffles 60 for retarding the flow of hot water therethrough for the purpose of reducing the temperature thereof and said chamber 58 always contains a small quantity of cold water so that any steam escaping through the hot water gear wheel valve 36 will be condensed therein before delivery to the mixing chamber 26 and outlet pipe 28. The arcuate passage 59 communicates with one side of the condenser chamber 58 while an arcuate passage 61 at the other side of the chamber 58 merges with the port 62 of the cold water valve above the latter and said passage 61 and port 62 lead to the mixing chamber 26.

The opening 35a in the valve seat 30 associated with the cold water supply pipe 23a is of greater length than the opening 35 in the valve seat 29 associated with the hot water supply so that upon operation of the gear wheel valves 36 cold water is initially received in its chamber 46 for delivery to the mixing chamber 26, a portion of this water flowing downwardly through the lateral port 61 into the condensing chamber 58 so that upon continued movement of the handle 51 and operation of the gear wheel valve, the hot water flowing from its chamber 46 by way of the passage 59 to the condensing chamber contacts the cold water in the mixing chamber 58 to have the temperature thereof reduced and any steam that may flow into the valve casing will be condensed in said chamber before escaping through the passage 61 for delivery to the mixing chamber 26. By moving the handle 51 in a counter-clockwise direction toward the sign "mix" cold water is initially passed through the valve casing in view of the relative positions of the openings 35—35a and openings 36a, continued movement of the handle later opening the passage 35 in the hot water valve 29, causing the hot and cold water both to flow. When the handle 51 is moved in a clockwise direction, only cold water is passed through the valve casing, the openings 35 and 35a in the valve seat being so related and associated with the openings 36a in the gear wheel valve as shown in Figure 3 to cause such operation. It will therefore be seen that with a valve structure of the character disclosed herein that the initial delivery of hot water is prevented so that all danger of being scalded by the use of this mixing valve is eliminated. Also, the condensing chamber in the valve structure is designed both for the reduction in temperature of the hot water as well as for the condensation of any steam that may be fed through the hot water supply pipe.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:—

1. In a mixing valve, a pair of gear wheel valves and a pinion directly engaged therewith, a disk seat for each valve having a valve opening therein, and a mating annular rib and groove in adjacent faces of the valve and seat.

2. In a mixing valve, a pair of gear wheel valves, a pinion directly engaged therewith, a disk seat for each valve having a valve opening therein, a mating annular rib and groove in adjacent faces of the valve and seat, and a pressure disk for maintaining the valve engaged with its seat.

3. In a mixing valve a pair of gear wheel valves, a pinion directly engaged therewith, a casing inclosing the valve mechanism, a water temperature reducing and steam condensation chamber therein, and a mixing chamber in communication with the condensation chamber.

4. In a mixing valve, a pair of gear wheel valves, a pinion directly engaged therewith, a disk seat for each valve having a valve opening therein, a mating annular rib and groove in adjacent faces of the valve and seat, a casing inclosing the valve mechanism, a water temperature reducing and steam condensation chamber therein and a mixing chamber in communication with the condensation chamber.

5. In a mixing valve, a pair of gear wheel valves, a pinion directly engaged therewith, a disk seat for each valve having a valve opening therein, a mating annular rib and groove in adjacent faces of the valve and seat, a pressure disk for maintaining the valve engaged with its seat, a casing inclosing the valve mechanism, a water temperature reducing and steam condensation chamber therein and a mixing chamber in communication with the condensation chamber.

6. In a mixing valve, a pair of gear wheel valves, a pinion directly engaged therewith, a casing inclosing the valve mechanism, a water temperature reducing and steam condensation chamber therein, a mixing chamber in communication with the condensation chamber, and staggered baffles in the condensation chamber.

7. In a mixing valve, a pair of gear wheel valves, a pinion directly engaged therewith, a disk seat for each valve having a valve opening therein, a mating annular rib and groove in adjacent faces of the valve and seat, a casing inclosing the valve mechanism, a water temperature reducing and steam condensation chamber therein, a mixing chamber in communication with the condensation chamber, and staggered baffles in the condensation chamber.

8. In a mixing valve, a pair of gear wheel valves, a pinion directly engaged therewith, a disk seat for each valve having a valve opening therein, a mating annular rib and groove in adjacent faces of the valve and seat, a pressure disk for maintaining the valve engaged with its seat, a casing inclosing the valve mechanism, a water temperature reducing and steam condensation chamber therein and a mixing chamber in communication with the condensation chamber, and staggered baffles in the condensation chamber.

9. In a mixing valve, a casing, hot and cold water inlets in the casing, separate valves for controlling the inlets, each including a disk valve seat, a gear wheel valve flatly engaged with the seat and rotatable thereon, and means for holding the valve engaged with the seat, a manually operable pinion engaged with the gear wheel valves, a condensation chamber for hot water entering the casing through the hot water inlet and a mixing chamber receiving water from the aforesaid chamber and cold water valve.

10. In a mixing valve, a casing, hot and cold water inlets in the casing, separate valves for controlling the inlets, each including a disk valve seat, a gear wheel valve flatly engaged with the seat and rotatable thereon, and means for holding the valve engaged with the seat, a manually operable pinion engaged with the gear wheel valves, a condensation chamber for hot water entering the casing through the hot water inlet and a mixing chamber receiving water from the aforesaid chamber and cold water valve, the outlet from the condensation chamber merging with the outlet of the cold water valve at the entrance side of the mixing chamber.

11. In a mixing valve, a casing, hot and cold water inlets in the casing, separate valves for controlling the inlets, each including a disk valve seat, a gear wheel valve flatly engaged with the seat and rotatable thereon, and means for holding the valve engaged with the seat, a manually operable pinion engaged with the gear wheel valves, a condensation chamber for hot water entering the casing through the hot water inlet and a mixing chamber receiving water from the aforesaid chamber and cold water valve, and said cold water valve operating in advance of the hot water valve when the mixing valve is operated for the delivery of hot water.

12. In a mixing valve, a casing, hot and cold water inlets in the casing, separate valves for controlling the inlets, each including a disk valve seat, a gear wheel valve flatly engaged with the seat and rotatable thereon, and means for holding the valve engaged with the seat, a manually operable pinion engaged with the gear wheel valves, a condensation chamber for hot water entering the casing through the hot water inlet and a mixing chamber receiving water from the aforesaid chamber and cold water valve, the outlet from the condensation chamber merging with the outlet of the cold water valve at the entrance side of the mixing chamber, and said cold water valve operating in advance of the hot water valve when the mixing valve is operated for the delivery of hot water.

13. In a mixing valve, a casing, hot and cold water inlets in the casing, separate valves for controlling the inlets, each including a disk valve seat, a gear wheel valve flatly engaged with the seat and rotatable thereon, and means for holding the valve engaged with the seat, a manually operable pinion engaged with the gear wheel valves, a condensation chamber for hot water entering the casing through the hot water inlet and a mixing chamber receiving water from the aforesaid chamber and cold water valve, said cold water valve operating in advance of the hot water valve when the mixing valve is operated for the delivery of hot water, said valve holding means including a tensioned disk and means for holding the valve seat and tensioned disk against rotation with the gear wheel valve rotatable therebetween.

14. In a mixing valve, a casing, hot and cold water inlets in the casing, separate valves for controlling the inlets, each including a disk valve seat, a gear wheel valve flatly engaged with the seat and rotatable thereon, and means for holding the valve engaged with the seat, a manually operable pinion engaged with the gear wheel valves, a condensation chamber for hot water entering the casing through the hot water inlet and a mixing chamber receiving water from the aforesaid chamber and cold water valve, the outlet from the condensation chamber merging with the outlet of the cold water valve at the entrance side of the mixing chamber, said cold water valve operating in advance of the hot water valve when the mixing valve is operated for the delivery of hot water, said valve holding means including a tensioned disk, and means for holding the valve seat and tensioned disk against rotation with the gear wheel valve rotatable therebetween.

In testimony whereof I affix my signature.

JAY J. MINTZ.